F. SCHUBERT.
SOUNDING APPARATUS.
APPLICATION FILED MAR. 17, 1911.

1,008,566.

Patented Nov. 14, 1911.
2 SHEETS—SHEET 1.

WITNESSES:
Edgar M. Greenbaum
Charles V. Sawyer

INVENTOR
Frederick Schubert,
BY
E. F. James
ATTORNEY

F. SCHUBERT.
SOUNDING APPARATUS.
APPLICATION FILED MAR. 17, 1911.

1,008,566.

Patented Nov. 14, 1911.

2 SHEETS—SHEET 2.

WITNESSES:
Ejar M Greenbaum
Charles V. Dwyer

INVENTOR
Frederick Schubert,
BY
E. F. Gannett
ATTORNEY

UNITED STATES PATENT OFFICE.

FREDERICK SCHUBERT, OF SELLERSVILLE, PENNSYLVANIA.

SOUNDING APPARATUS.

1,008,566.  Specification of Letters Patent.  Patented Nov. 14, 1911.

Application filed March 17, 1911. Serial No. 615,027.

*To all whom it may concern:*

Be it known that I, FREDERICK SCHUBERT, a citizen of the United States, and resident of Sellersville, in the county of Bucks and State of Pennsylvania, have invented certain new and useful Sounding Apparatus, of which the following is a specification.

This invention relates to a sounding apparatus of the kind lowered into the water by a rope or cable, the pressure being indicated by a pointer and dial showing the vertical depth to which the apparatus has been lowered, the object being to produce an apparatus having a movement which is balanced in its several parts so that in raising or lowering or in handling during or after a test, the indicator will remain stationary until purposely reset by inverting or by pushing a resetting plunger inward for that purpose.

A further object is to provide a case, pointed at each end, whereby soundings can be taken while the ship is in motion without causing any excessive drag or resistance on the apparatus or on the line from which it is suspended.

A further object is to provide a means for graduating the weight of the apparatus to adapt it for shallow or deep sea sounding.

My invention is shown in the accompanying drawings in which—

Figures 1, 2:
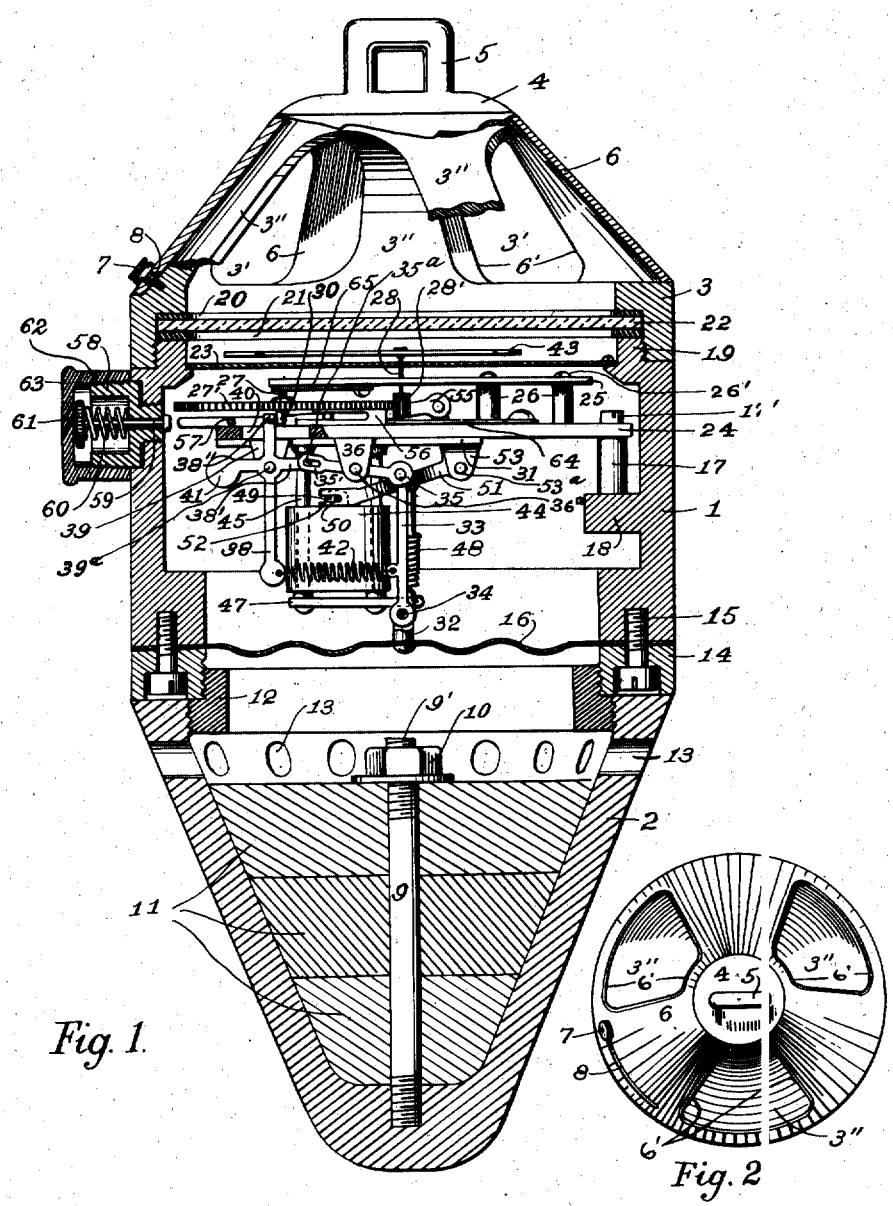
Figure 3:
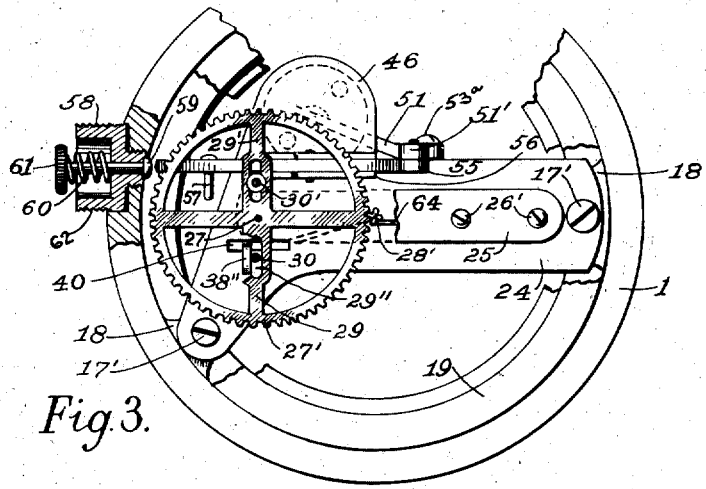
Figure 4:
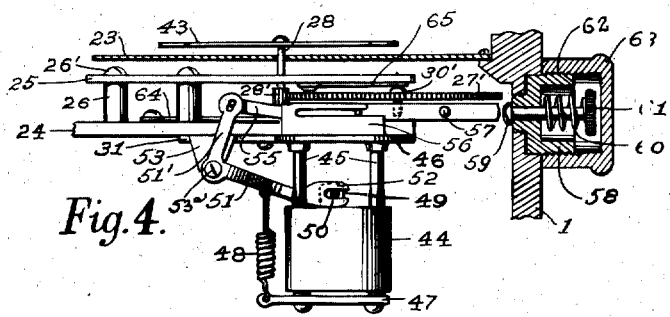
Figure 5:
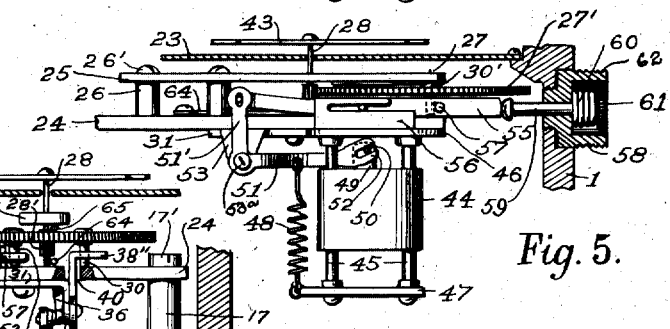
Figure 6:
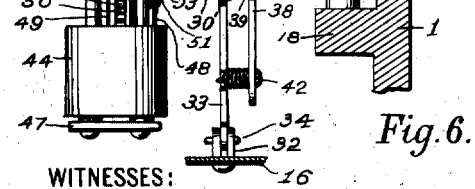

Figure 1 is an elevation of the complete apparatus; the case is shown in center section, the movement being shown in elevation except where broken away for clearness of illustration. Fig. 2 is a top view of the apparatus, reduced in size, showing the sliding cover closed. Fig. 3 is a plan view of the movement, the upper part of the movement case including the glass, dial and pointer being removed; part of the gear wheel arm and the movement frame are broken away; part of the case and the resetting plunger bushing are shown in section, the movement being in a normal position, that is, at rest, as shown in Fig. 1. Fig. 4 is a side elevation of the obverse side of the movement, in normal position, to illustrate the resetting device; the case and dial are shown in section and broken away, the resetting plunger bushing being shown in section. Fig. 5 is similar to Fig. 4 except that the resetting plunger is shown as pushed inward and the resetting weight raised from its seat, and Fig. 6 is an end view of the movement in a normal position, as seen from the resetting side, the case and diaphragm being broken away.

In Letters Patent No 987,260 granted to me March 21, 1911, for a sounding apparatus, the movement is actuated by a Bourdon tube spring, and is locked when the bottom has been touched or reached. In the present application the movement is actuated by a corrugated metallic diaphragm against which the water presses, the movement being connected with said diaphragm by links and levers as will be more fully hereinafter described. The dial is graduated in feet or fathoms, a pointer indicating the vertical depth reached by the sounder.

The complete body is preferably of cast metal and consists of the movement case, 1, the inverted conical weight case, 2, and the glass protecting case or top, 3, the latter having three openings, 3', for observation; three arms 3'' connect the annular body, 3, with a center, 4, having a staple, 5, for suspending the apparatus by a rope or cable, not shown. A rotary sliding cover, 6, having three openings 6', which aline with the openings, 3', between the arms when the cover is an open position, or which completely closes the top case when rotated is provided. Fig. 1 shows the case open and Fig. 2 shows it closed. A screw, 7, passing through a slot, 8, affords a simple means to hold the cover open or closed.

The weight case, 2, has a central rod, 9, having a thread, 9', and a nut 10. A number of weights, 11, is removably placed in the case to vary the weight as may be required. A series of openings, 13 permits water to enter the case, 2, under the diaphragm. This weight case is fastened to a threaded ring, 12, which is fastened in a ring, 14, by screw threads as shown. The movement case, 1, consists of said ring, 14, which is fastened to the lower edge by a series of screws, 15, a metallic diaphragm, 16, being tightly screwed between the said ring and case, as shown in Fig. 1. The movement is held in place by a number of studs, 17, and screws, 17', which studs rest on projecting brackets 18, in the case. The upper end of the movement case is provided with a male thread, 19, upon which the female thread of the glass protecting case, 3, screws; 20, 21 are rubber washers, placed respectively above and below a glass disk, 22, to make the interior of the movement case watertight. A dial, 23, rests in the case above the movement and is held in place by screws or otherwise.

The movement consists of the lower frame, 24, fastened on the studs 17 by screws 17' and an upper frame, 25, held in place by studs, 26, and screws, 26', in which two frames the gear wheel shaft, 27, and the pinion shaft, 28, are journaled. 28' is a pinion wheel whose teeth mesh into those in the gear wheel, 27'. The gear wheel is provided with two oppositely disposed arms 29, 29' each having a radial slot 29" into which pins, 30, 30' respectively, are adjustably positioned, the said arms standing at right angles with the movement frame when in a normal position, as shown in Fig. 3. Fastened to and below said frame, 24, is a plate, 31, having a series of suspended brackets 36, 39 and 53 which have bearings 36ª, 39ª, and 53ª for the several levers and cranks of the movement. A forked stud, 32, is fastened centrally to the diaphragm, 16, into which stud a link, 33, is secured by a pin or screw, 34; this link is connected to a lever, 35, which articulates in a bracket 36, the other end of said lever having an elongated slot, 35', in which a pin 35ª or screw slides, said pin being placed in a crank arm, 38', which extends at right angles from a lever, 38, fulcrumed in a bracket, 39, the lever extending upward above the lower frame, 24, the free end, 38", of said lever being bent at right angles to stand in the path of the pin, 30, in the arm, 29, of the gear wheel. A slot, 40, in the lower movement frame, permits movement of the free end, 38", of lever 38. The arm, 41, extending outward from the lever 38 opposite the crank arm 38' acts as a counter balance. The link, 33, and the lower end of the lever, 38, are pierced and a helical spring, 42, is fastened in said piercings to prevent lost motion.

The resetting mechanism is placed on the opposite sides of the movement hereinbefore described, and consists of a sliding weight, 44, suspended from and upon two rods, 45, fastened to a curved plate, 46 (which is a continuation of plate, 31) the free ends of said rods passing through a plate, 47, one end of which extends outward beyond the circumference of the weight, the said end being pierced and provided with a helical spring, 48, the upper end of which is fastened in the piercing in the crank, 51. A bifurcated stud, 49, placed centrally in the top of the weight, has a pin 50 passing through it, which pin engages the free end of the L crank, 51, mentioned above, the jaws, 52, straddling said pin and permitting lateral movement; the lower arm of the crank 51 is offset to aline with the center of the weight as shown. The upper arm, 51', of the crank connects with a slide, 55, suitably mounted between parallel bearings, 56, the slide extending and projecting beyond the movement plate, 24. A pin, 57, is placed near the free end of the slide so as to engage the pendent pin, 30', in the arm, 29', of the gear wheel, 27', when the slide is pushed or drawn inward for resetting.

The case, 1, may be tapped for a bushing, 58, in which a rod, 59, is slidably mounted, a spring, 60, pushing against the head, 61, keeping the rod in a normal position.

A male thread, 62, offers a means for seating a cap, 63, in position to protect the head and rod and make the bushing watertight. A friction spring, 64, presses against the pinion shaft, 28, while another spring, 65, presses against the gear wheel shaft, 27, the friction of the two springs preventing free motion of the two shafts until actuated by the movement in operation in either direction.

Such being the construction, the operation, which has partly been explained, is as follows:—When a sounding is to be taken, the apparatus is inverted and given a sudden jerk downward so that the resetting weight, 44, will cause that part of the movement which it actuates to set the indicator to zero. The sliding cover, 6, is closed and the apparatus is lowered into the water. The pointed shape of the case permits the apparatus to enter the water with little resistance and no splashing. As the water enters through the holes, 13, the depth pressure acts against the diaphragm which is pressed upward, carrying with it the link, 33, and actuating the lever, 35, and crank, 38, the bent upper end, 38", pressing against the pin, 30, in the gear wheel, 27', and causing the pinion, its shaft and indicator to move in a forward direction, the two friction springs, 64, 65, preventing accidental displacement or movement. When the apparatus is raised from the water, the shape of the upper case and cover prevent any drag and thus there is little resistance, the cover also protecting the glass against possible breakage. The cover is opened by rotating it, when released by the screw, 7, the depth indicated by the pointer on the dial is noted, and the movement is reset to zero, by inverting as hereinbefore described, or the cap, 63, may be unscrewed and the head, 61, of the plunger pressed inward, (as shown in Fig. 5) whereby the movement is reset to zero, the pin, 57, on the slide, 55, engaging the pin, 30', in the arm, 29', of the gear wheel, 27', and carrying the wheel around until the pin, 30, touches the free end 38" of the lever 38 and the movement is again set in a normal condition—that is at zero. The spring, 48, pulling down on the arm, 51, compels the weight, 44, to remain in the position shown in Figs. 1 and 4 during the sounding, the object of the spring being to keep the weight in its lowered position when the apparatus is drawn from the water aboard of a moving ship and to prevent the weight from leaving its position during the handling of the apparatus.

For deep sea sounding, added weight may be given to the apparatus by inserting any number of lead weights, 11, in the lower case.

What I claim is:—

1. In a sounding apparatus, a body having a watertight movement case, a movement and a dial in said case, a link, a diaphragm pressing upwardly against said link, said link connecting said diaphragm with said movement whereby said movement is actuated in one direction only, and means for resetting said movement to zero, said means comprising a weight which actuates the movement in one direction only, a lower case provided with radial openings for the ingress and egress of water, and an upper case provided with a series of radial arms and means for closing the openings between said arms.

2. In a sounding apparatus of the kind described, a body having a watertight movement case, a movement, means for actuating said movement in a forward direction, and independent means for actuating said movement in a reverse direction, and a dial indicating the depth, a pointer mounted on said movement above said dial, the entire movement and indicating means being placed in said watertight case.

3. In a sounding apparatus of the kind described, a body comprising a pointed upper case and a pointed lower case, a watertight movement case, said pointed cases being fastened respectively above and below said cylindrical watertight movement case, a movement in said watertight case, means for actuating said movement in one direction only, and independent means for actuating said movement in a reverse direction for resetting said movement to zero.

4. In a sounding apparatus of the kind described, a body consisting of two cone shaped cases positioned above and below and attached to a cylindrical watertight movement case, said watertight movement case being closed against the entrance of water by a glass disk between two annular rubber washers above and below said glass disk above said movement case, and closed against the entrance of water at the bottom of said case by a metal diaphragm having annular corrugations, a movement and a link, said diaphragm being connected to said movement in said case by said link whereby an upward pressure against said diaphragm actuates said movement in one direction only, and means within said watertight case for actuating said movement in a reverse direction for resetting said movement to zero.

Signed at Sellersville in the county of Bucks and State of Pennsylvania this 15th day of March, A. D. 1911.

FREDERICK SCHUBERT.

Witnesses:
RICHARD WERCHAN,
WM. A. HEINRICH.